J. DEMAREST.
Pipe-Joints.

No. 144,663.

Patented Nov. 18, 1873.

Witnesses:

Inventor:
J. Demarest
Per
Attorneys.

UNITED STATES PATENT OFFICE.

JOHN DEMAREST, OF MOTT HAVEN, NEW YORK, ASSIGNOR TO HIMSELF AND JORDAN L. MOTT, OF SAME PLACE.

IMPROVEMENT IN PIPE-JOINTS.

Specification forming part of Letters Patent No. 144,663, dated November 18, 1873; application filed September 20, 1873.

*To all whom it may concern:*

Be it known that I, JOHN DEMAREST, of Mott Haven, in the county of Westchester and State of New York, have invented a new and Improved Pipe-Joint, of which the following is a specification:

The invention will first be fully described, and then pointed out in the claim.

Figure 1:
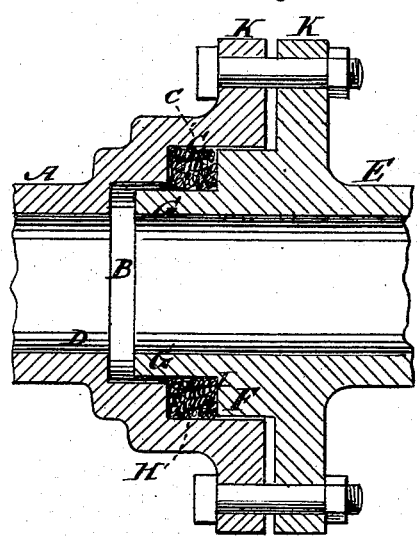
Figure 2:
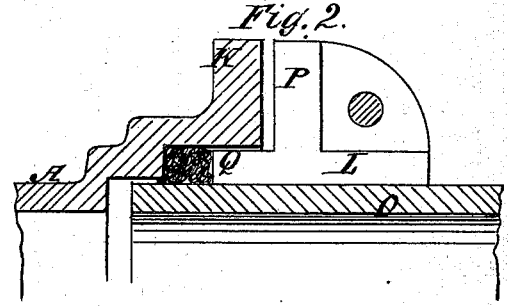
Figure 3:
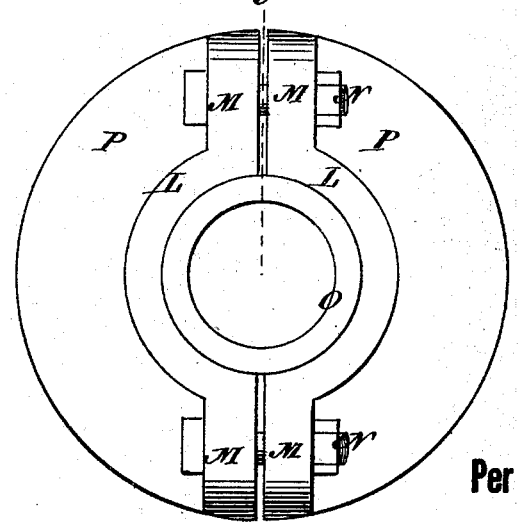

Figure 1 is a longitudinal section of a couple of sections of pipe coupled together by my improved plan. Fig. 2 is a section, showing the mode of coupling on a piece not having a flange, and Fig. 3 is an end elevation of a piece of pipe having a flange applied to it by means of the aforesaid two-part collar.

Similar letters of reference indicate corresponding parts.

A represents a piece of pipe having chambers B C formed in the end larger than the bore D. E represents a piece of pipe having an extension, F, beyond the flange fitting snugly in the part C of the chamber, not quite as far as the bottom, and having a smaller extension, G, extending into the part B of said chamber. H represents packing in part C of the recess between the bottom and shoulder I, which, being packed in tight when the flanges K are bolted together, makes a tight joint. L represents the two-part collar, which I propose to use in connection with this kind of joint for connecting short pieces not having a flange, K. Said collar consists of two semicircular pieces with flanges M at the ends, by which they are firmly clamped upon the piece of pipe O, and thus constitute a flange, P, to be bolted to flange K of the other section. This collar has an extension, Q, beyond the flange, for entering the chamber C, while the end of the pipe itself enters part B of the chamber. By this contrivance any short piece can be coupled the same as the whole pieces having flanges at the ends.

I am aware that packings somewhat similar have been used heretofore; but they are exposed to the water or acid, and therefore liable to be forced out of place into the pipe. The relative construction of the parts that make up my pipe-joint looks mainly to the avoidance of this objection, and practical experiment has demonstrated its efficiency in that regard.

Having thus described my invention, I claim as new and desire to secure by Letters Patent—

The pipes A E, having corresponding end enlargements, with two annular recesses to form chambers B C, the former to receive extension G, and the latter to form a close chamber for the packing, in the manner set forth, so that the packing will not be exposed to the water or acid, and thus gradually be forced out of its place into the pipe.

JOHN DEMAREST.

Witnesses:
A. P. THAYER,
T. B. MOSHER.